(12) United States Patent
Dheedene et al.

(10) Patent No.: US 11,151,620 B2
(45) Date of Patent: Oct. 19, 2021

(54) METHOD AND SYSTEM FOR THE PAYMENT OF A SERVICE AND/OR A PRODUCT WITH RESPECT TO A VEHICLE LOCATION

(71) Applicant: PickMeUp NV, Antwerp (BE)

(72) Inventors: Nelson Dheedene, Antwerp (BE); Olivier de Clercq, Antwerp (BE)

(73) Assignee: Concar NV, Antwerp (BE)

( * ) Notice: Subject to any disclaimer, the term of this patent is extended or adjusted under 35 U.S.C. 154(b) by 254 days.

(21) Appl. No.: 16/329,253

(22) PCT Filed: Aug. 28, 2017

(86) PCT No.: PCT/IB2017/055150
§ 371 (c)(1),
(2) Date: Feb. 28, 2019

(87) PCT Pub. No.: WO2018/042307
PCT Pub. Date: Mar. 8, 2018

(65) Prior Publication Data
US 2019/0188761 A1 Jun. 20, 2019

(30) Foreign Application Priority Data
Aug. 29, 2016 (BE) .................................. 2016/5661

(51) Int. Cl.
*G06Q 30/02* (2012.01)
*G07B 15/02* (2011.01)
*G06Q 50/30* (2012.01)

(52) U.S. Cl.
CPC ......... *G06Q 30/0284* (2013.01); *G06Q 50/30* (2013.01); *G07B 15/02* (2013.01)

(58) Field of Classification Search
CPC ..... G06Q 30/0284; G06Q 50/30; G07B 15/02
See application file for complete search history.

(56) References Cited

U.S. PATENT DOCUMENTS 6,112,152 A * 8/2000 Tuttle .................. G07B 15/063
340/5.61
9,963,011 B2 * 5/2018 Wittliff et al. ..... B60H 1/00742
701/49
(Continued)

FOREIGN PATENT DOCUMENTS

CN 104036554 A * 9/2014 ............ G07B 15/06
DE 20313653 U1 11/2003
(Continued)

OTHER PUBLICATIONS

Roberts, Graeme, "GERMANY: Audi automates car park payments,"just—auto global news, Bromsgrove, Aroq Limited, Jun. 10, 2013.*

*Primary Examiner* — Nathan Erb
(74) *Attorney, Agent, or Firm* — James Creighton Wray

(57) ABSTRACT

The present invention relates to a method for the payment of a service and/or a product with respect to a vehicle and a parking location, wherein said vehicle is managed by a user, wherein said vehicle comprises a vehicle device, wherein said method comprises amongst other things the following steps: the arrival of said vehicle at said parking location; the transmission of a session request comprising a coordinate to a back-end infrastructure by said vehicle device; the receipt of an availability and/or a price indication of said parking location by said vehicle device of said back-end infrastructure; if said parking location is available, the initiation of a parking session belonging to said service and/or said product.

14 Claims, 3 Drawing Sheets

(56) References Cited

U.S. PATENT DOCUMENTS

| | | | |
|---|---|---|---|
| 10,019,682 B2* | 7/2018 | Farrelly et al. | ............................... G06Q 10/063114 340/932.2 |
| 2006/0157563 A1* | 7/2006 | Marshall | ................ G07F 7/1008 235/382 |
| 2012/0176255 A1 | 7/2012 | Choi | |
| 2014/0107861 A1* | 4/2014 | Harris | .................... G07C 5/008 701/1 |
| 2014/0225763 A1* | 8/2014 | Kavaler | ................ B60W 30/06 342/70 |
| 2014/0232569 A1* | 8/2014 | Skinder | .................. G08G 1/144 340/989 |
| 2014/0232570 A1* | 8/2014 | Skinder | .................. G08G 1/005 340/989 |
| 2015/0073647 A1 | 3/2015 | Ubik | |
| 2015/0310744 A1* | 10/2015 | Farrelly | ................. G08G 1/005 340/932.2 |
| 2016/0140649 A1* | 5/2016 | Kleve | ................... H04W 12/04 705/307 |
| 2017/0154474 A1* | 6/2017 | Bae | .................... G06Q 20/3278 |
| 2017/0190233 A1* | 7/2017 | Wittliff, III | ............ B60N 2/002 |

FOREIGN PATENT DOCUMENTS

| | | |
|---|---|---|
| WO | 02079931 A2 | 10/2002 |
| WO | 2009155933 A1 | 12/2009 |
| WO | 2012090229 A2 | 7/2012 |
| WO | 2015081968 A1 | 6/2015 |

\* cited by examiner

METHOD AND SYSTEM FOR THE PAYMENT OF A SERVICE AND/OR A PRODUCT WITH RESPECT TO A VEHICLE LOCATION

This application claims the benefit of Belgian Application No. BE2016/5661 filed Aug. 29, 2016 and PCT/IB2017-055150 filed Aug. 28, 2017, International Publication No. WO 2018/042307, which are hereby incorporated by reference in their entirety as if fully set forth herein.

TECHNICAL DOMAIN

The invention relates to a service for a vehicle provided with a vehicle device such as an OBD dongle.

STATE OF THE ART

A problem with the known methods and systems for the payment of services and/or products for parking ends is the excessive complexity of the operation and the payment.

WO 2012/090229 describes a system for the authentication of vehicles by means of an identity dongle and an on-board diagnostic unit. The identity dongle is connected to a vehicle by means of an OBD unit. The whole is used for the identification of the driver of the vehicle. A problem with a concept according to WO 2012/090229 is that no solution is offered for the possible payment of the services to which the concept relates.

US 2014/0225763 discloses an apparatus which allows detecting parking locations for vehicles. It comprises an on-board device handling parking sessions and payments. A disadvantage of an apparatus according to US 2014/0225763 is however that the apparatus does not provide for an on-board diagnostic connection or similar with the engine control unit of the vehicle, resulting in an inadequate Information flow. Furthermore, US 2014/0225763 also does not offer a solution for the processing of payments.

US 2012/0176255 presents a method for assisting a user of a vehicle for localizing the vehicle when it has been parked. The method comprises the use of an on-board diagnostic manager. A weakness of a method according to US 2012/0176255 is that the method requires the use of a mobile device for both recording the parking location as well as retrieving the vehicle, making the user unnecessarily dependent of the presence and the correct functioning of a mobile device. Moreover, US 2012/0176255 does not mention any type of payment for a parking session.

Furthermore, WO 02/079931, US 2015/073647, WO 2015/081968 and U.S. Pat. No. 8,768,565 also describe concepts relating to the present invention.

The present invention aims to find a solution for at least some of the above-mentioned problems. There is a need for an improved method and an improved system for the payment of services and/or products.

SUMMARY OF THE INVENTION

The present invention relates to improved methods and improved systems for the payment of services and/or products.

In a first aspect, the invention concerns a method for the payment of a service and/or a product relating to a vehicle and a parking location, wherein said vehicle is managed by a user, wherein said vehicle comprises a vehicle device, wherein said method comprises the following steps:

(a) the arrival of said vehicle at said parking location;

(b) the transmission of a session request comprising a coordinate to a back-end infrastructure by said vehicle device;

(c) the receipt of an availability and/or a price indication of said parking location by said vehicle device;

(d) if said parking location is available, the initiation of a parking session belonging to said service and/or said product;

(e) the registration and/or transmission to said back-end infrastructure of session related information by means of said vehicle device;

(f) the ending of said parking session by said vehicle device;

(g) the transmission of a termination notification to said back-end infrastructure;

(h) leaving of said vehicle from said parking location;

(i) having a price paid for said service and/or said product;

wherein said vehicle device preferably concerns an OBD dongle; wherein said transmission in step (b) and/or said ending in step (f) by said vehicle device is triggered automatically by switching off and/or starting an engine of said vehicle, wherein said price is a function of at least said parking location and a session duration, and wherein said payment is made automatically.

For the user, a first advantage of such a method is that it allows him or her to pay a parking fee without additional actions, such as the use of a payment card, coins or sending an SMS. In this way, he or she uses the vehicle as a means of payment. At the same time, the vehicle is used as a way to inform about the intentions of the user. On the one hand, switching off the engine is linked to an intention to park, on the other hand, starting the engine is linked to an intention to end a parking session. This leads to a larger efficiency of the parking process. A second advantage is that, thanks to the verification of the availability and/or price indication according to said method, the user is informed if the related parking location can also effectively be used as a parking location, and at what price. In this way, parking fines or costs for towing the vehicle can be avoided. Further advantages for the user are the fact that the user can obtain detailed historical and/or real-time information with respect to the parking location and/or the vehicle, as a result of which potential problems with the parking location and/or the vehicle can be identified in an early phase.

In a preferred embodiment, said vehicle device concerns an OBD dongle, wherein said vehicle device preferably comprises an OBD supply interface for supplying power to said vehicle device by said vehicle. The vehicle device is then supplied via the OBD connector which is present in the vehicle. Such an embodiment is in particular advantageous because in this way, the vehicle device has a fixed place in the vehicle, is not bothering, and cannot get lost, with an increased ease of use as a result. Because of the nature of the vehicle device, it is always present in the vehicle and always disposes of a power supply, which is easier in use than for example a smartphone, which can be unavailable because of an exhausted battery as a result of the frequent use for diverse ends. In an embodiment wherein said vehicle device is fed by the vehicle, moreover the vehicle device does not have to dispose of a battery and/or the user is not obliged to feed the vehicle device with power via a more complex way, further resulting in an increased ease of use. Because it is a separate OBD dongle, the user has moreover the ease that the computing power and battery of his/her smartphone is not charged with said method, which is the case in many methods according to the state of the art. In a more preferred embodiment, said vehicle device is configured for functioning without receiving information of an on-board computer via an OBD data interface. This is advantageous because in this way, the method is not dependent on the arbitrariness of the vehicle manufacturers, who can decide freely whether or not they allow the OBD connector in the vehicle to have access to the vehicle information. This is in contrast with supplying power over the OBD connector, a functionality which is provided by most of the vehicle manufacturers. Therefore, a vehicle device being designed as an OBD dongle, but not dependent on data sent over the OBD connector, is both practical and reliable in use.

In a preferred embodiment, said vehicle device comprises a sensor which is adapted to detect a movement pattern with respect to said vehicle, preferably to detect a movement pattern of said vehicle; wherein said vehicle device is configured to realize said automatic triggering by said switching-off based on at least a first detected movement pattern which is detected with said sensor; and wherein said vehicle device is configured to realize said automatic triggering by said starting based on at least a second detected movement pattern which is detected with said sensor. This embodiment can be combined advantageously with a design as OBD dongle which is configured to function (also) without receiving data over the OBD connector. Such a design is advantageous because it can complement or replace information provided over the OBD connector, and can thus lead to an increased accuracy and reliability. Moreover, such a design is in particular adapted to the operation of electric vehicles. Of electric vehicles, it is known that they typically accelerate more quickly than vehicles with a combustion engine, simplifying the detection of said first detected movement pattern. In a further preferred embodiment, said sensor comprises an accelerometer; wherein said first detected movement pattern relates to a deceleration of said vehicle; and wherein said second detected movement pattern relates to an acceleration of said vehicle. The use of an accelerometer is advantageous because it concerns a proven technology, which can result in robust measurements. Moreover, the accelerometer can carry out measurements in circumstances and at locations where other forms of movement detection, such as movement detection based on GPS localization, are not available. In a related preferred embodiment, said sensor comprises a GPS receiver; wherein said first detected movement pattern relates to staying at one same detected GPS location for a period of time exceeding a predetermined time threshold; wherein said second detected movement pattern relates to changing a detected GPS location. Such a design is in particular advantageous because the vehicle device can advantageously make use of GPS localisation for both determining a coordinate for transmission in step (b), and detecting movement patterns. In an even more preferred embodiment, the sensor comprises both an accelerometer and a GPS receiver. This combination is in particular complementary and therefore even more advantageous, as will be explained later in this document.

In a second aspect, the present invention concerns a system for the payment of a service and/or product in accordance to a method according to claims 1-14, comprising:

(i) a vehicle device, provided with a processor, tangible non-volatile memory, programming on said memory to control said vehicle device, a GPS receiver, a combination of one or more of the following wireless network interfaces: a Bluetooth interface, a Wi-Fi interface, a GSM interface, a mobile data interface, an RFID interface; wherein said vehicle device preferably concerns an OBD dongle and is provided with an OBD connector; wherein said vehicle device preferably comprises a sensor and/or a security sensor;

(ii) a back-end infrastructure comprising a back-end server for communicating with said vehicle device;

(iii) a third-party sever for managing an availability and a price of a parking location;

(iv) optionally, a user device, preferably a smartphone, a tablet, a mobile phone or a smartwatch, wherein said user device is provided with a user device processor, tangible non-volatile memory, programming on said user device memory to control said user device processor, a screen, a wireless network interface;

wherein said vehicle device is configured preferably, to be connected to a vehicle by means of said OBD connector, to be connected in a wireless way to said back-end infrastructure, optionally, to be connected in a wireless way to said user device, to detect a switching-off and/or starting of an engine of said vehicle at (the level of) said parking location, to transmit, triggered by said switching-off, a session request comprising a coordinate to said back-end infrastructure, to receive an availability and/or a price indication with respect to said parking location from said back-end infrastructure, wherein a parking session belonging to said service and/or said product is initiated if said parking location is available, to register and/or to transmit session related information to said back-end infrastructure and/or optionally to said user device, wherein said session related information comprises a specification of said vehicle and/or account data of said user and/or a first parameter intended for an operator and/or a second parameter intended for a third party and/or a security parameter, to end said parking session triggered by said starting, thereby sending a termination notification to said back-end infrastructure;

wherein said back-end infrastructure is configured to correlate said coordinate received from said vehicle device with said parking location, to transmit an availability request comprising said parking location to said third-party server, to receive said availability and/or said price indication from said third-party server and to transmit it to said vehicle device, wherein a parking session belonging to said service and/or said product is initiated if said parking location is available, to receive said session related information from said vehicle device and to transmit it at least partially to said third-party server and/or said user device, to receive said termination notification from said vehicle device and to transmit it to said third-party server, to receive a price from said third-party server and to execute a payment;

wherein said third-party server is configured to receive said availability request comprising said parking location from said back-end infrastructure, to transmit said availability and/or said price indication to said back-end infrastructure, thereby initiating said parking session if said parking location is available, to receive said session related information from said back-end infrastructure, to receive said termination notification from said back-end infrastructure, to calculate said price for said service and/or said product and to transmit it to said back-end infrastructure;

wherein said user device is configured to receive said session related information from said back-end infrastructure and/or optionally from said vehicle device, to display said session related information on said screen, wherein said price is a function of at least said parking location and a session duration, and wherein said payment is made automatically.

Further embodiments are described in the dependent claims and the detailed description.

DETAILED DESCRIPTION

Figure 1:
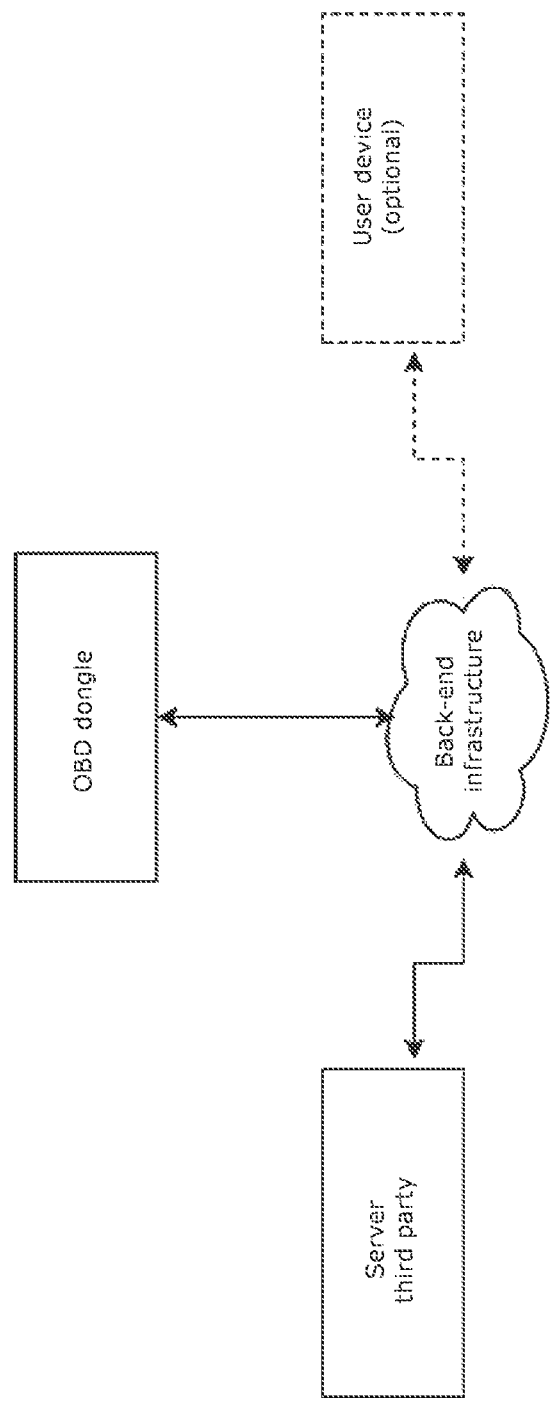
FIG. 1 illustrates the architecture of an example embodiment of the present invention.

Unless defined otherwise, all terms which are used in the description of the invention, including technical and scientific terms, shall have the meaning as they are generally understood by the skilled person in the technical field of the invention. For a better assessment of the description of the invention, the following terms are explained explicitly.

The terms "comprise", "comprising", "consist of", "consisting of", "provided with", "contain", "containing" are synonyms and are inclusive or open terms which indicate the presence of what follows, and which do not exclude or prevent the presence of other components, characteristics, elements, members, steps, known from or described in the state of the art.

In a first aspect, the present invention concerns a method for the payment of a service and/or a product with respect to a vehicle and a parking location.

In the present document, the term "vehicle" refers to a motorized means of transport that is appropriate for the transport of passengers and/or goods over the road. The vehicle is hereby provided with an OBD interface, but is for the rest not limited with respect to the type or size. It hereby involves for example a passenger vehicle, a delivery van, a minibus, a bus, a touring car, a motor bike or a moped. The vehicle can be self-driving; it can be partially self-driving or completely self-driving. In a preferred embodiment, the vehicle is provided with a combustion engine. In an alternative embodiment, the vehicle concerns an electric vehicle, i.e. a vehicle with an electric engine. Here, it can be a "purely" electric vehicle without a combustion engine, or a hybrid vehicle, with both an electric engine and a combustion engine.

In the present document, the term "service" refers to a service that is offered to a user by means of a parking system, wherein the service relates to a vehicle that is under the control of a user. In a preferred embodiment, the service comprises a "parking session", wherein the parking session relates to the parking of the vehicle at a parking location between a time of arrival and a time of departure. In a preferred embodiment, a parking session starts at the time at which the engine of the vehicle is switched off, a moment which is typically later than the moment at which the vehicle arrives. In a preferred embodiment, the parking session ends at the moment at which the engine of the vehicle is started, a time which is typically earlier than the moment at which the vehicle leaves. In an alternative embodiment, the start and/or the end of the parking session does not coincide with one of said moments, but is however related thereto.

The service is offered to the user against payment. Hereby, the term "payment" refers to a kind of compensation for the service and/or the product rendered. In a preferred embodiment, this compensation consists of a financial transaction, in an alternative embodiment, this compensation consists of an equivalent non-financial transaction of an acquired "credit", such as a "credit" built up at the supplier of the service and whether or not associated with a loyalty card or membership, or a voucher which is equivalent to a credit. In still another embodiment, the payment is settled without a transaction being linked to it, for example because the user has a subscription with the third party.

In the context of the present document, it is supposed that the vehicle can be in a switched-off state, or also "OFF", hereafter referred to as "OFF", as well as a switched-on or at least ready-to-go state, or also "ON", hereafter referred to as "ON". In the present document, the same terms refer to the state of the engine of the vehicle, which is by definition at any time in the same state as the vehicle. By "Switching off" the engine of the vehicle is meant a complete switching-off of the activity of the engine, according to the intention of a driver, from "ON" to "OFF". The intention of the driver is hereby to park the vehicle for a certain time, for a duration of e.g. at least 3 minutes. This means that the driver explicitly switches off the vehicle, e.g. by turning the ignition to the "OFF" position by means of a key, or, according to more recent designs, by pressing an "ON/OFF" button which is present in the vehicle. Likewise, "starting" the engine of the vehicle means a complete start of the activity of the engine, from "OFF" to "ON". This means that the driver explicitly starts the vehicle, e.g. by turning the ignition to the "ON" position by means of a key, or by pressing an "ON/OFF" button which is present in the vehicle. In an alternative embodiment, switching off or starting is made by still other mechanisms, e.g. in case of a self-driving car wherein the user lets the vehicle park itself and subsequently switch off. Also in such a case, "switching off" and "starting" relate to the intention of a user to switch off or start the vehicle, with finally a transition from "ON" to "OFF" or vice versa. This applies to both vehicles with a combustion engine and electric vehicles, which can whether or not be partially or completely self-driving. In certain embodiments with a combustion engine, the vehicle is provided with a start-stop system, which is aimed at limiting the fuel consumption. With such a system, the average engine activity is reduced by automatically switching off certain parts of the combustion engine when the vehicle stops, during a stop cycle, for example at a red traffic light or in a traffic jam. The relevant parts of the engine are switched on again by the start-stop system when the driver accelerates and/or changes gear and/or turns the wheel, during a start cycle. In the context of the present document, the vehicle is already during all these start and stop cycles by definition in the "ON" state, as the driver has the intention to keep the vehicle in switched-on and ready-to-go state. The ignition typically also stays continuously active. Only when the user explicitly switches off the vehicle with the intention to park or starts the vehicle with the intention to end a parking session, the state of the engine changes from "ON" to "OFF" or vice versa. With electric vehicles, there is no explicit ignition, but there is functionality available to switch "ON" or "OFF" the vehicle depending on the intention of the user.

In this document, the abbreviation "OBD" refers to on-board diagnostics, a vehicle management system and interface for reading information with respect to the vehicle and its operation. Hereby, the OBD connector offers a connection to an engine control unit, on-board computer or equivalent control unit related to the vehicle. For most vehicles, the possibility is provided that the vehicle supplies power via the OBD connector to connected devices which are adapted thereto. In order to be adapted thereto, the device must be provided with an OBD supply interface. In addition, it is preferably possible that the vehicle transmits data via the OBD connector to connected devices which are adapted thereto. In order to be adapted thereto, the device must be provided with an "OBD data interface". It should be remarked here that the modalities according to which the vehicle transmits data via the OBD connector strongly depend on the particular type of vehicle, according to specific choices of the manufacturer of the vehicle. Important types of data concern the ON signal and the OFF signal, indicating the new state of the vehicle and its engine at a transition from ON to OFF or vice versa. With a vehicle with a combustion engine, with an explicit "ignition", it is often the case that the manufacturer allows the vehicle to transmit a signal via the OBD connector about the state of the vehicle, with for example an ON signal when the vehicle is switched on and an OFF signal when the vehicle is switched off. With an electric vehicle, there is no ignition in the strict sense, and there are diverse types of vehicles known wherein the manufacturer has chosen not to transmit any information via the OBD connector about the ON or OFF state of the vehicle. This is however unrelated to the supply of power over the OBD connector, a functionality which is provided by most of the vehicle manufacturers.

In a preferred embodiment, the dongle, mentioned in the present document, is designed according to the international OBD-II and/or EOBD (European on-board diagnostics) standard. This type of dongle is referred to with the term "OBD dongle". Preferably, this OBD dongle comprises at least an OBD supply interface for being supplied of power by the vehicle to which the dongle is connected. Accordingly, in a preferred embodiment of the dongle and/or OBD dongle, the geometry of the connector meets the standard SAE J1962. In an alternative embodiment, the OBD dongle comprises a connection interface for wireless OBD connection, allowing the OBD dongle to make a wireless connection to the electronic control system of the vehicle.

When connecting the vehicle device to the on-board computer via the OBD connector, preferably, a connection is set up, wherein the vehicle device requests information from the Electronic Control Module (ECU), which is part of the on-board computer, by means of OBD requests. Preferably, one or more of the following parameters are requested: engine speed (preferably expressed in rotations per minute (RPM), i.e. the number of rotations that the crankshaft makes per minute at a particular moment), vehicle speed (preferably expressed in km/h), engine load, state of the brake or handbrake, and temperature of the coolant. The determination as to whether the vehicle is ON or OFF, can be done based on these parameters. A first way consists of periodically requesting the engine speed and the vehicle speed, for example every 2 seconds, and determining that the vehicle is OFF when both remain zero for a period longer than a predetermined period, for example 2 minutes. A second way is possible because most vehicles no longer respond to OBD requests when they are switched off. After a predefined period without responses, for example 20 seconds, it can be decided that the vehicle is OFF. Another way consists of requesting the state of the handbrake, and supposing the vehicle is OFF in case of an active handbrake. In case of an electric vehicle or a hybrid vehicle, the current intensity of the current which is supplied by the battery can also be a basis, preferably combined with the vehicle speed, to determine the state of the vehicle.

In a preferred embodiment of the present invention, the vehicle device comprises a GPS receiver or GPS module. GPS refers to Global Positioning System, and is only one of the many possible positioning systems based on satellites, grouped under the term Global Navigation Satellite System (GNSS). Although in the present document, the term GPS is used, the invention can also be applied to any other type of GNSS, and in this context, GPS is thus interchangeable with GLONASS, Galileo or BeiDou.

In the present document, different interested parties are identified. The term "user" refers to the person who acts in the context of the service as the manager of the vehicle. In a preferred embodiment, this person is also the driver of the vehicle, in a further preferred embodiment, the user is the person linked to the electronic means of payment which is responsible for a payment relating to the service. The service is offered to the user by the "operator", who is responsible for the operational management of the service. The service is offered under the surveillance of a "third party", who is involved in a combination of one or more of the following aspects of said service: the user, said parking place, said vehicle, said parking session. An example is the case in which the third party is the manager of a parking place which is related to the service. Another example is the case in which the third party is the manager of a vehicle which is related to the service. In an alternative embodiment, the operator and the third party are the same entity.

In this document, diverse devices and systems are discussed. The term "mobility system", also simply called "system", is the whole of the infrastructure enabling the offering of the service to users. The mobility system comprises "back-end infrastructure", or simply called "back-end", which is at least partially managed by the operator and plays a coordinating role in the mobility system. Furthermore, the mobility system comprises a "third-party server" which exchanges information with this back-end infrastructure with respect to the service. Furthermore, the mobility system comprises a "vehicle device" which is present in the vehicle and exchanges information with the back-end infrastructure with respect to the service. In a preferred embodiment, the vehicle device is configured by the operator according to requirements of the third party. In a preferred embodiment, the vehicle device comprises an OBD dongle. In a preferred embodiment, the mobility system comprises a "user device" which belongs to the user and which enables the user to send and receive information with respect to the service. In a preferred embodiment, the user device exchanges information with the back-end infrastructure and/or the vehicle device. This transmission and receipt is preferably made possible by means of an application and/or an app on the user device; in an alternative embodiment, this transmission and receipt is possible thanks to a web-based access, in which the user has access to said information via a web browser.

In a preferred embodiment, the user device is a smartphone, a tablet, a mobile phone, a smartwatch or any other mobile electronic device with at least a screen for displaying the received and sent information, and preferably comprises an app for access to the mobility system.

In this document, the term "automatic payment" means that the payment occurs without manual intervention of the user. This is preferably possible because an electronic means of payment which is linked to the user is automatically requested to pay for the service. This electronic means of payment can be linked to a credit card, a bank card, a credit that is acquired at the organiser of the parking service, a voucher, etc. In the context of the application of parking, the automatic payment is a counterpart of typical methods of payment such as inserting coins or a bank card in a parking meter, or payment via SMS. Although a classic parking meter according to the state of the art can also accept an electronic means of payment, this payment is not made automatically, as the user still has to carry out manual operations at the parking meter, such as inserting a bank card. Likewise, parking with payment via SMS or via a mobile app according to the state of the art is not made automatically, as the user still has to start a parking session manually.

According to a preferred embodiment, the vehicle device sends a coordinate or a set of coordinates to the back-end. The back-end uses this coordinate to determine if the position of the vehicle falls within a particular "geofence" which is known to the system. The term "geofence" hereby refers to a virtual perimeter which is defined as a demarcation of a physical geographic surface. In a system according to the present invention, it is determined if a transmitted coordinate falls within the geofence which is associated with a parking location, in order to link a coordinate to a parking location.

In a preferred embodiment, said vehicle device comprises a GPS receiver and/or a wireless network interface, preferably a Bluetooth interface and/or a Wi-Fi interface and/or a GSM interface and/or a mobile data interface and/or an RFID interface. Hereby, the GPS receiver offers at least the possibility to geographic localisation, while the listed possible technologies for a wireless network connection at least allow to send or receive data. Hereby, a "GSM interface" concerns an interface allowing mobile speech communication and the exchange of SMS messages via the cellular network of mobile operators, for example a 2G network. Furthermore, a "mobile data interface" concerns an interface allowing mobile data communication via the cellular data network of mobile operators, preferably a 2G network or higher. An "RFID interface" concerns an interface for data communication with Radio Frequency identification. In a preferred embodiment, the wireless network interface is used to set up a connection with the back-end, wherein the internet connection required thereto is made possible or not by an intermediate device in the dose vicinity of the vehicle device, such as a device of the user, whether or not equal to said user device. In an alternative embodiment, the user device does not only act as an intermediate device, but the vehicle device and the user device also directly exchange information without the intervention of the back-end.

In a preferred embodiment, said session request and/or said session related information comprises a specification of said vehicle and/or account data of said user and/or a first parameter intended for an operator and/or a second parameter intended for a third party. A possible specification of said vehicle is for example the number plate or the chassis number. Hereby, account data of said user refer to completed parameters which relate to the vehicle device and/or the vehicle and/or the user. These account data are available for the operator and/or the third party for processing. Further, a first parameter which is intended for the operator according to a further preferred embodiment can comprise a specific request of the user directed to the operator, such as the request to monitor information with respect to the vehicle during the parking session. In a preferred embodiment, the third party is also informed thereof, in an alternative embodiment, this is not the case. Also, a second parameter which is intended for the third party according to a preferred embodiment can comprise a request of the user to the third party. It can for example concern the request for a price reduction based on loyalty or based on characteristics/privileges as stored in the account data. In a further preferred embodiment, said session request is converted by said back-end infrastructure into a request for availability directed to the third party. In a further preferred embodiment, a response of the third party to this request for availability comprises an availability and/or a price indication. For determining the availability and/or the price indication, the specification of said vehicle and/or other information comprised in the session request and the request for availability is taken into account or not. Hereby, the availability indicates whether or not one can park at the particular location, and by extension whether or not it is paying. The price indication gives an indication of the price for parking, in the form of an hourly rate and/or a fixed rate for a part of the day and/or a combination thereof.

In a preferred embodiment, said session request and/or said session related information comprises a security parameter of said vehicle, wherein said security parameter is continuously tracked by means of said vehicle device, wherein said security parameter relates to a combination of one or more of the following aspects of said vehicle: the being open of a door, the being open of a boot lid, the being active of a parking lock such as a handbrake, the being intact of a window, the displacement of said vehicle, the being active of an alarm, going off of an alarm. This has the advantage that the user gets a detailed overview of the state of his/her vehicle during the parking session, something which is impossible in a situation with a classic parking meter. Hereby, the "continuous" character of the tracking refers to a situation wherein the registration and transmission of information is not limited to the moment at which a session is started or stopped, but also occurs at intermediate moments, preferably corresponding to a predefined scheme.

In a preferred embodiment of the present invention, said user receives one or more electronic messages on a user device with respect to said parking session, wherein said one or more electronic messages comprise session related information and/or a price indication. In a preferred embodiment, it hereby relates to an electronic parking message which is composed to the attention of the user. The parking message can amongst other things take one or more of the following message forms: an SMS message, an email, a web page inbox message, a VoIP speech message, a real-time generated message, a web page with real-time presentation content, a mobile push notification or any similar form of electronic correspondence, by which information is "pushed" to the user. In a further preferred embodiment, said user receives a state message belonging to said one or more electronic messages prior to parking, wherein said state message comprises an availability of said parking location with respect to said vehicle and/or said price indication. This has the advantage that the user can remotely estimate if a parking location is available, prior to effectively going to that location.

In a further embodiment of the present invention, said security parameter is also tracked at a time falling outside said parking session. In a related alternative embodiment of the present invention, the service and/or the product is not related to the parking of a vehicle, but to the fact whether or not if a vehicle of which the ignition is "ON", is moving. In such a case, the vehicle device, preferably the OBD dangle, can be used to track information regarding the vehicle at times when the vehicle is not parked. In particular, a system according to the present invention can make it possible to offer one or more of the following functionalities: detecting a vehicle, tracking a vehicle, monitoring the driving behaviour, carrying out a diagnostic test of the vehicle, detecting a crash. Moreover, the vehicle device, preferably the OBD dongle, can also track said security parameter while the vehicle is in operation. Such functionality is in particular advantageous if said third party is the manager of a fleet of vehicles provided with the system according to the present invention. This offers the manager more control over his fleet, and also allows him to react faster to incidents. In the case the incident concerns a crash, this also leads to a higher security for the user in the vehicle. Said functionality is also advantageous if said service concerns a form of road charging. As with a parking related service, the system according to the present invention provides a way to pay in an easy and automatic way for the use of the road infrastructure. Compared to an electronic system for road charging with on-board unit according to the state of the art, a system according to the present invention has the advantage that it is largely automated, and therefore leads to a more efficient way of paying.

In a further preferred embodiment, the present invention concerns the payment of a service and/or a product which is not related to parking. An example is the payment of a service related to the cleaning and/or the maintenance and/or the repair of the vehicle, wherein the third party is a car wash or a garage. Another example is the payment of a service with respect to a paying travelling, such as the use of a toll road or tunnel, or the transport of the vehicle with a truck, ferry boat, train or similar. These examples can also occur in combination, such as in the case of a vehicle assistance service ensuring both the transport and the repair of the vehicle.

In a preferred embodiment of the present invention, said service and/or said product are paying. It will however be clear that they can also be offered for free. This corresponds to an alternative embodiment with price and price indication equal to zero.

In a further embodiment, the service comprises a product which relates to said parking place and/or said vehicle and/or said parking session and/or said user.

As described above, said accelerometer can carry out measurements in circumstances and at locations where other forms of movement detection, such as movement detection based on GPS localization, are not available. In a preferred embodiment, the sensor comprises both an accelerometer and a GPS receiver. This combination is in particular complementary as the GPS receiver (or, equivalent, a GPS module) is typically not available in certain circumstances. A first example is when a GPS receiver has no reception in parking garages with thick (concrete) walls, underground garages or tunnels. In such a case, the vehicle device preferably keeps the last determined coordinate. Thanks to the accelerometer, the vehicle device is still able to determine when the vehicle is parked or started again. In a preferred embodiment, the vehicle device is able to calculate an estimate of the location of the vehicle in function of the time based on the measurement of the accelerometer. At such an estimate, use can advantageously be made of card data. If card data indicate that the last determined coordinate is for example in the neighbourhood of a tunnel, then it can be expected that the vehicle still drives according to the driving direction. For the estimate, one can or cannot take into account a measured speed of the vehicle. If card data indicate that the last determined coordinate corresponds to for example a parking garage, then one can, at the estimate, better assume a local displacement within the boundaries of the parking garage. A second example is when the vehicle device has just been switched on. Typically, the vehicle device is indeed switched off after a particular time of standstill, for example 3 minutes, in order to save its own battery or the battery of the vehicle supplying power to the vehicle device. For the switching on, in urban areas with high-rise buildings and especially in covered environments such as parking garages, it can take a while before the GPS receiver can determine a location. Thanks to the accelerometer, movement can however already be detected as from the first movement. These considerations are also further discussed in the below examples.

In an alternative embodiment, said vehicle device comprises a Bluetooth interface; wherein said vehicle device is configured to establish a Bluetooth connection with an on-board computer of said vehicle via said Bluetooth interface; wherein said vehicle device is configured to realize said automatic triggering by said switching-off based on at least the interruption of said Bluetooth connection; and wherein said vehicle device is configured to realize said automatic triggering by said starting based on at least the re-establishment of said Bluetooth connection. This embodiment can be combined with any type of vehicle device, and can advantageously be combined with a design such as an OBD dongle without receipt of data sent over the OBD connector. Such an embodiment is ideally advantageous in cases where no other sources of information are available about the being ON or OFF of the vehicle. Most vehicles now dispose of a Bluetooth interface, and many thereof support connection with several devices simultaneously. The establishment of a connection with the vehicle device is thus possible with most vehicles, and also does not have to cause any interference with other Bluetooth connections, such as the connection of the on-board computer with a smartphone of the user via Bluetooth. Preferably, the vehicle device concerns an OBD dongle which is located in the vehicle at the moment when the vehicle is switched off and the on-board computer interrupts the current Bluetooth connections. In this way, the vehicle device is informed in a simple way that the vehicle has been switched off. When starting the vehicle, the on-board computer of the vehicle tries to re-establish the current Bluetooth connections, and the vehicle device is thus informed that the vehicle has been switched on. By interrupting and re-establishing the connection purely at the initiative of the vehicle, and not at the initiative of the vehicle device, the state of the connection is univocally connected to the state of the vehicle. In a preferred embodiment, information about the switching off is advantageously used by the vehicle device as a trigger for passing to an energy-saving mode.

According to a further aspect of the invention, which is not meant to limit the invention in any way, the invention relates to the following points.
1. Method for the payment of a service and/or a product with respect to a vehicle and a parking location, wherein said vehicle is managed by a user, wherein said vehicle comprises a vehicle device, wherein said method comprises the following steps:
    (a) the arrival of said vehicle at said parking location;
    (b) the transmission of a session request comprising a coordinate to a back-end infrastructure by said vehicle device;

(c) the receipt of an availability and/or a price indication of said parking location by said vehicle device;

(d) if said parking location is available, the initiation of a parking session belonging to said service and/or said product;

(e) the registration and/or transmission to said back-end infrastructure of session related information by means of said vehicle device;

(f) the ending of said parking session by said vehicle device;

(g) the transmission of a termination notification to said back-end infrastructure;

(h) the leaving of said vehicle from said parking location;

(i) having a price paid for said service and/or said product;

wherein said vehicle device concerns an OBD dongle; wherein said transmission in step (b) and/or said ending in step (f) by said vehicle device is triggered automatically by switching off and/or starting an engine of said vehicle, wherein said price is a function of at least said parking location and a session duration, and wherein said payment occurs automatically.

2. A method according to point 1, wherein said vehicle device comprises a GPS receiver and/or a wireless network interface, preferably a Bluetooth interface and/or a Wi-FI interface and/or a GSM interface and/or a mobile data interface and/or an RFID interface.

3. A method according to points 1 and 2, wherein said session request and/or said session related information comprises a specification of said vehicle and/or account data of said user and/or a first parameter intended for an operator and/or a second parameter intended for a third party.

4. A method according to any of points 1 up to and including 3, wherein said session request and/or said session related information comprises a security parameter of said vehicle, wherein said security parameter is continuously tracked by means of said vehicle device, wherein said security parameter relates to a combination of one or more of the following aspects of said vehicle: the being open of a door, the being open of a boot lid, the being active of a parking lock such as a handbrake, the being intact of a window, the displacement of said vehicle, the being active of an alarm, going off of an alarm.

5. A method according to any of points 1 up to and including 4, wherein said user receives one or more electronic messages on a user device with respect to said parking session, wherein said one or more electronic messages comprise session related information and/or an indication of said price.

6. A method according to point 5, wherein said user receives a state message belonging to said one or more electronic messages prior to said arrival of said vehicle at said parking location in step (a), wherein said state message comprises an availability of said parking location with respect to said vehicle and/or said price indication.

7. A method according to any of points 4 up to and including 6, wherein said security parameter is also tracked at a time falling outside said parking session.

8. A system for the payment of a service and/or product according to a method according to any of points 1 to 7, comprising:

(i) an OBD dongle, provided with an OBD connector and preferably provided with an OBD dongle processor, tangible non-volatile OBD dongle memory, OBD dongle programming on said OBD dongle memory to control said OBD dongle processor, a GPC receiver, and a combination of one or more of the following wireless network interfaces: a Bluetooth interface, a Wi-Fi interface, a GSM interface, a mobile data interface, an RFID interface;

(ii) a back-end infrastructure, preferably comprising a back-end server, wherein said back-end server is preferably provided with a back-end server processor, tangible non-volatile back-end server memory, and programming on said back-end server memory to control said back-end server processor;

(iii) a third-party server, preferably provided with a third-party server processor, tangible non-volatile third-party server memory, and programming on said third-party server memory to control said third-party server processor;

(iv) optionally, a user device, preferably a smartphone, a tablet, a mobile phone or a smartwatch, wherein said user device is preferably provided with a user device processor, tangible non-volatile user device memory, programming on said user device memory to control said user device processor, a screen, a wireless network interface;

wherein said OBD dongle is configured
to be connected to a vehicle by means of said OBD connector,
to be connected in a wireless way to said back-end infrastructure,
optionally, to be connected in a wireless way to said user device,
to detect a switching-off and/or starting of an engine of said vehicle at the level of a parking location,
to transmit, triggered by said switching-off, a session request comprising a coordinate to said back-end infrastructure,
to receive an availability and/or a price indication with respect to said parking location from said back-end infrastructure, wherein a parking session belonging to said service and/or said product is initiated if said parking location is available,
to register and/or to transmit session related information to said back-end infrastructure and/or optionally to said user device, wherein said session related information preferably comprises a specification of said vehicle and/or account data of said user and/or a first parameter intended for an operator and/or a second parameter intended for a third party and/or a security parameter,
to end said parking session triggered by said starting, thereby sending a termination notification to said back-end infrastructure;

wherein said back-end infrastructure is configured
to correlate said coordinate received from said OBD dongle with said parking location,
to transmit an availability request comprising said parking location to said third-party server,
to receive said availability and/or said price indication from said third-party server and to transmit it to said OBD dongle, wherein a parking session belonging to said service and/or said product is initiated if said parking location is available, to receive said session related information from said OBD dongle and to transmit it at least partially to said third-party server and/or said user device,
to receive said termination notification from said OBD dongle and to transmit it to said third-party server,
to receive a price from said third-party server and to make a payment;
wherein said third-party server is configured
to receive said availability request comprising said parking location from said back-end infrastructure,
to transmit said availability and/or said price indication to said back-end infrastructure, thereby initiating said parking session if said parking location is available,
to receive said session related information from said back-end infrastructure,
to receive said termination notification from said back-end infrastructure,
to calculate said price for said service and/or said product and to transmit it to said back-end infrastructure;
wherein said user device is configured
to receive said session related information from said back-end infrastructure,
to display said session related information on said screen,
wherein said price is a function of at least said parking location and a session duration, and wherein said payment occurs automatically.

9. An OBD dongle for use in a system according to point 8, wherein said OBD dongle is configured for carrying out a method according to any of point 1 up to and including 7.

10. Back-end infrastructure for use in a system according to point 8, wherein said back-end infrastructure is configured for carrying out a method according to any of point 1 up to and including 7.

11. A third-party server for use in a system according to point 8, wherein said third-party server is configured for carrying out a method according to any of point 1 up to and including 7.

12. A user device for use in a system according to point 8, wherein said user device is configured for carrying out a method according to any of point 1 up to and including 7.

In the following, the invention will be illustrated by means of non-limiting examples. These examples are not intended and should not be interpreted to as limiting the scope of the invention.

Example 1

Parking Service

This example concerns a possible embodiment of said service, wherein the service comprises a parking session of a vehicle with OBD dongle.

FIG. 1 illustrates the architecture of an example embodiment of the present invention. An OBD dongle which is present in the vehicle of a user is connected to a back-end infrastructure via a network connection. The back-end infrastructure is further connected to a server of a third party, in this case also a "parking server".

Furthermore, there is also an optional connection to a user device, for example a smartphone, with the back-end infrastructure, wherein the use of a dotted line in the figure indicates the optional character.

Figure 2:
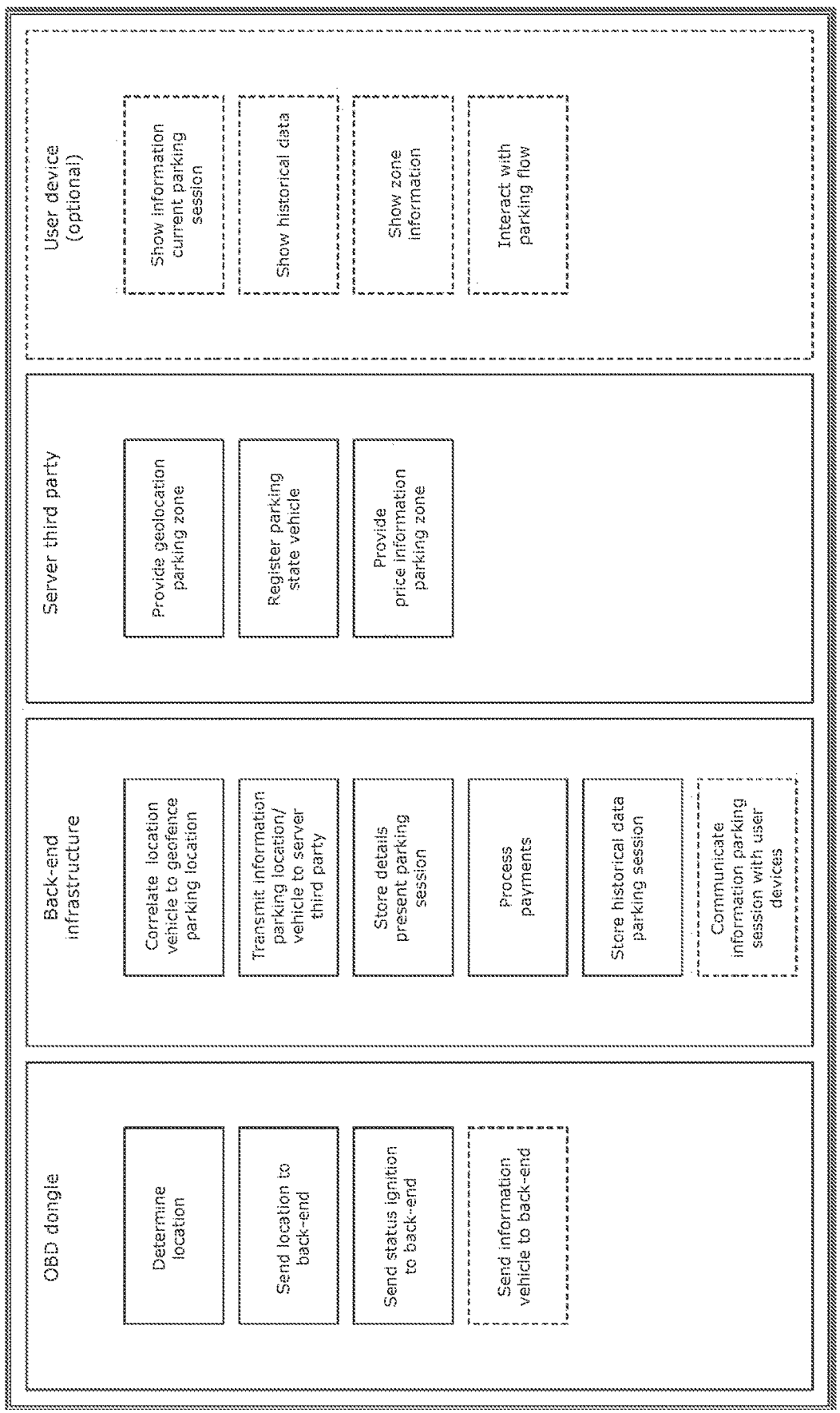
FIG. 2 shows a system overview of an example embodiment of the present invention.

FIG. 2 shows a system overview of an example embodiment of the present invention. The system comprises in the first place three system units: the OBD dongle, the back-end infrastructure and the server of the third party. Optionally, a fourth system unit can also be present, i.e. the user device, wherein the use of a dotted line in the figure again indicates the optional character.

The OBD dongle supports the system by carrying out different tasks, and is connected to the vehicle via the OBD connection. In a preferred embodiment, the OBD dongle is fed via the OBD connection; in an alternative embodiment, the OBD dongle is fed via batteries or via an external source. The OBD dongle fulfills different tasks.

A first task of the OBD dongle consists in the determination of the location. Hereto, the OBD dongle disposes in a preferred embodiment of a GPS receiver, wherein the location of the OBD dongle and thus also of the vehicle can be determined. In an alternative embodiment, the determination of the location is partially supported or completely carried out by means of one or more technologies with which the OBD dongle is or is not equipped; Bluetooth; Wi-Fi; GSM; mobile data connection, preferably 2G or higher; RFID. In a preferred embodiment, the determination of the location is carried out by means of the GPS receiver, supported by Wi-Fi. In an alternative embodiment, the determination of the location is partially supported or completely carried out by functionality which is present or available at the on-board computer of the vehicle and which is sent via the OBD connection to the OBD dongle.

A second task is the transmission of the location, in a preferred embodiment a set of coordinates, to the back-end infrastructure. In a preferred embodiment, this transmission is made by means of one or more technologies with which the OBD dongle is or is not equipped; Bluetooth; Wi-Fi; GSM; mobile data connection, preferably 2G or higher; RFID.

Furthermore, the OBD dongle sends the state of the ignition to the back-end infrastructure, wherein this state can take the modes "ON" or "OFF". In a preferred embodiment, this state is sent at the moment when this state is changed, triggered by the switching-on or -off of the engine of the vehicle. In a further preferred embodiment, this state is also sent at intermediate times, which can be a control mechanism ensuring a good operation of the system.

Optionally, the OBD dongle also sends (session related) information to the back-end. This kind of transmission can be done with the same technology as the one used for the transmission of locations, but can also differ therefrom.

The back-end (infrastructure) is managed by an operator, and fulfills a central role in the system. The back-end thereby functions as a "hub" with respect to the other system units. The package of tasks comprises the following tasks.

The back-end correlates the location of the vehicle to a geofence with respect to the parking location. In a preferred embodiment, one starts hereby from a set of coordinates which have been sent by the OBD dongle. For these coordinates, a search is subsequently carried out for checking whether they are located within a geofence which is associated with one of the parking locations which are known to the system. If successful, this task results in the identification of a parking location.

The back-end transmits information with respect to the parking location and the vehicle to the server of the third party. This can for example concern the parking location such as determined by the correlation of the vehicle with a geofence.

Furthermore, the back-end stores details concerning the present parking session in the memory.

Here too, the back-end handles the processing of payments. In a preferred embodiment, this takes place after a price setting, which is done by bringing together session related information with price information which is present on the server of the third party. The processing of the payments is made automatically, without manual intervention of the user.

The back-end also stores historical parking data in the memory.

Optionally, the back-end also ensures the communication with user devices, if present, wherein session related information is provided.

The server of the third party, also called third-party server, is under the control of the third party. In a preferred embodiment, the third party is the manager of parking places. The following tasks are carried out by this server.

The third-party server provides geolocations of parking zones comprising parking locations to the back-end. Hereby, it relates to the coordinates of groups of parking places as recorded according to a geographical map. This geolocation is used by the back-end for correlation of location with geofences.

Furthermore, the third-party server registers the parking state of the vehicle, in accordance with information received via the back-end.

Finally, the third-party server provides price information with respect to a parking zone to the back-end, so that a price can be determined for a parking session.

Optionally, the system also comprises a user device which is available to the user, Via an app or a web page, the user obtains access to the system. The user device fulfills the following tasks.

The user device shows information about the current parking session.

The user device shows historical data about earlier parking sessions.

Furthermore, the user device shows zone information, such as a price indication for parking.

The user device also allows the user to interact with the parking flow.

In a preferred embodiment, the back-end infrastructure and the server of the third party are separate system units. In an alternative embodiment, the server of the third party is an integral part of the back-end infrastructure, wherein a third party gets access to the system via the back-end infrastructure, for example via a web-based access. The latter then corresponds to a cloud-based architecture from the point of view of the third party.

Figure 3:
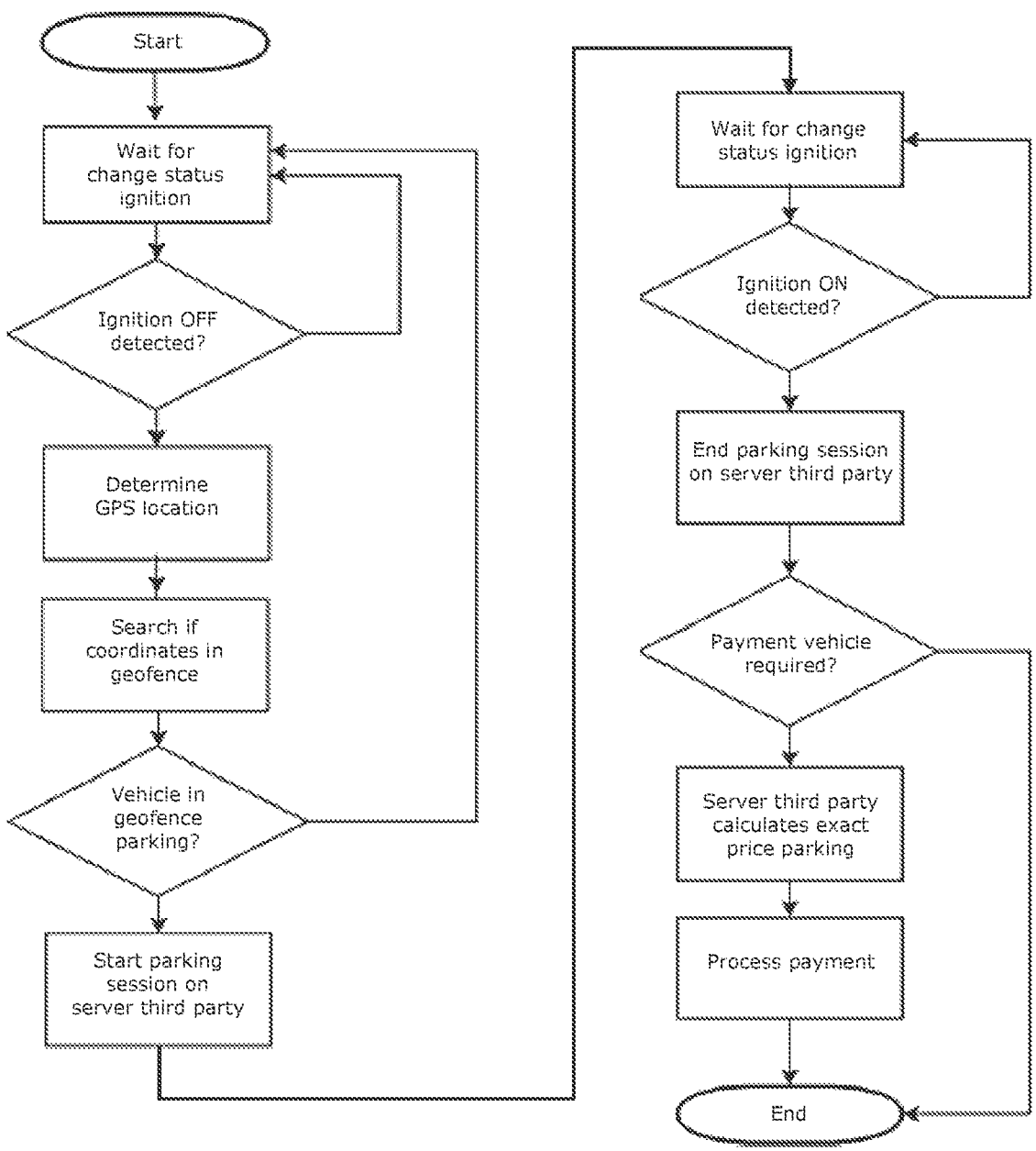
FIG. 3 shows a flow chart with respect to an example embodiment of the present invention.

FIG. 3 shows a flow chart with respect to an example embodiment of the present invention. It hereby deals about the successive steps for going through a parking session cycle, from start to end. This cycle is passed through from start to end if a parking session can effectively be started. If no session can be started, for example because the vehicle is not located at a parking location which is known to the system, then the cycle is only passed through partially, and resumed again from the start. Hereby, it concerns a set of tasks which are carried out by the system as a whole, thanks to the execution of tasks of one or more system units in each step.

At the start of the cycle, it waits a change of the state of the ignition. If a change to "OFF" has been detected, it continues determining the GPS location. This leads to coordinates. Subsequently, it is checked if the coordinates fall within a geofence which is known to the system. If yes, the vehicle is located in the geofence of a parking/parking location, and it can proceed to the start-up of a parking session at the server of the third party. If not, then the cycle is interrupted and re-initiated at the start again. Once the parking session has been started, it waits for a change of the state of the ignition. If a change to "ON" has been detected, the parking session as it is running on the server of the third party, is ended. Subsequently, it is determined if the parking session of the particular vehicle should be paid. If yes, then the price is calculated based on price information which is available at the server of the third party. Finally, the payment is processed, by which the payment occurs automatically. This ends the cycle. Subsequently, it returns to the start state, so that a new cycle can be started.

Example 2

Waking Up of the Vehicle Device in a Hybrid Vehicle

In this example, the vehicle is a hybrid vehicle with both a combustion engine and an electric engine. The vehicle is OFF and the vehicle engine is in the sleep mode, and should detect when the vehicle is switched on. The vehicle device concerns an OBD dongle which is fed by the vehicle via an OBD supply interface. The vehicle device establishes a data connection with the on-board computer via an OBD data interface. By periodically interrogating the on-board computer via OBD requests during the sleep mode, the vehicle device detects that the ignition becomes active. Concretely, it is detected that the RPM value is different from zero, and that the engine speed of the ignition engine is different from zero. This triggers in turn said ending of said parking session in step (f).

Example 3

Waking Up of the Vehicle Device in an Electric Vehicle in a Parking Garage

In this example, the vehicle is a (purely) electric vehicle. The vehicle is OFF and the vehicle device is in a sleep mode, and should detect when the vehicle is switched on. The vehicle device preferably concerns an OBD dongle. The OBD dongle is possibly configured to establish a data connection with the on-board computer of the vehicle via the OBD connector, but in this example, it cannot do this, for example because the vehicle does not sufficiently support this, and moreover, no RPM value is available. The vehicle device comprises a sensor with an accelerometer and a GPS receiver. During the sleep mode, only the accelerometer is fed, and the GPS receiver is temporarily switched off. By monitoring the accelerometer, the vehicle device detects at a particular moment that the vehicle moves. This is a trigger for switching from the sleep mode to an active mode, with the activation of the GPS receiver. In a preferred embodiment, said ending of said parking session in step (f) is based on movement which has been detected by both the accelerometer and the GPS receiver.

In an alternative embodiment, the parking session is ended according to step (f) once the accelerometer detects movement.

Example 4

Waking Up of the Vehicle Device in an Electric Vehicle in a Parking Garage After Expiry of a Predefined Period Like in Example 3, the vehicle is a (purely) electric vehicle. The vehicle is OFF and the vehicle device is in a sleep mode, and should detect when the vehicle is switched on. In this example, the OBD dongle is explicitly configured to establish a data connection with the on-board computer of the vehicle via the OBD connector. The vehicle however detects that such a connection is not possible, because no response has been received from the on-board computer. The vehicle device however also comprises a sensor with an accelerometer and a GPS receiver, allowing to detect the switching off and on of the vehicle. During the sleep mode, only the accelerometer is fed, and the GPS receiver is temporarily switched off. By monitoring the accelerometer, the vehicle device detects at a particular moment that the vehicle moves. This is a trigger for switching from the sleep mode to an active mode, with the activation of the GPS receiver. Because the vehicle is located in a parking garage, a GPS coordinate cannot immediately be determined. After expiry of a predefined period, the session is however still ended, and as a result the accelerometer thus forms the only trigger for ending said parking session in step (f). In a preferred embodiment, the last determined coordinate before entering the parking garage is used as a temporary coordinate at/after ending the parking session.

Example 5

Hybrid Vehicle with Detection Based on Bluetooth Connection

In this example, the vehicle is a hybrid vehicle with both a combustion engine and an electric engine. The vehicle device is an OBD dongle which is fed by the vehicle via on OBD supply interface. The vehicle device does not establish a data connection with the on-board computer of the vehicle via the OBD connector, but via a wireless Bluetooth connection. The connection is set up once by means of the user when the vehicle is switched on. Subsequently, the connection is active as long as the vehicle is switched on. Once the vehicle has been switched off, it interrupts the connection with the vehicle device, which, as a result, detects that the connection has been interrupted, and starts a parking session. When the vehicle is switched on again, the on-board computer tries to re-establish the existing Bluetooth connections. The vehicle device detects this request and re-establishes the connection with the vehicle again. This simultaneously forms a trigger to end the current parking session. By interrupting and re-establishing the connection purely at the initiative of the vehicle, and not at the initiative of the vehicle device, the state of the connection is univocally connected to the state of the vehicle. The vehicle device thus has a clear view of the state of the vehicle, which would not be the case if the vehicle device would for example be a smartphone, which can be taken out of the vehicle, and would therefore also lead to an interruption of the Bluetooth connection, without the vehicle being switched off.

The invention claimed is:

1. A method for payment of a service and/or a product with respect to a vehicle and a parking location, wherein said vehicle is managed by a user, wherein said vehicle comprises a vehicle device, wherein said method comprises the following steps:
(a) arrival of said vehicle at said parking location;
(b) transmission of a session request comprising a coordinate to a back-end infrastructure by said vehicle device;
(c) receipt of an availability and/or a price indication of said parking location by said vehicle device of said back-end infrastructure;
(d) determination that said parking location is available, and initiation of a parking session belonging to said service and/or said product;
(e) registration and/or transmission to said back-end infrastructure of session related information by said vehicle device;
(f) ending of said parking session by said vehicle device;
(g) transmission of a termination notification to said back-end infrastructure;
(h) leaving of said vehicle from said parking location; and
(i) having a price paid for said service and/or said product;
wherein said vehicle device is an OBD dongle; wherein said transmission in step (b) by said vehicle device is automatically triggered in response to a switching-off of an engine of said vehicle; wherein said ending in step (f) by said vehicle device is automatically triggered in response to a starting of said engine of said vehicle; wherein said price is a function of at least said parking location and a session duration; wherein payment of said price occurs automatically; wherein said vehicle device comprises a sensor which is adapted to detect a movement pattern with respect to said vehicle, to detect a movement pattern of said vehicle; wherein, in response to the vehicle device at least having detected a first movement pattern with said sensor, said vehicle device becomes configured to react by said automatically triggering in response to said switching-off of said engine of said vehicle; wherein, in response to the vehicle device at least having detected a second movement pattern with said sensor, said vehicle device becomes configured to react by said automatically triggering in response to said starting of said engine of said vehicle; wherein said sensor comprises an accelerometer; wherein said first detected movement pattern relates to a deceleration of said vehicle; and wherein said second detected movement pattern relates to an acceleration of said vehicle.

2. The method according to claim 1, wherein said vehicle device comprises an OBD supply interface for supplying power to said vehicle device by said vehicle.

3. The method according to claim 2, wherein said vehicle device comprises an OBD data interface for receiving information from an on-board computer of said vehicle; wherein said vehicle device is configured for realizing said automatic triggering by said switching-off based on receipt of at least an OFF signal of said on-board computer via said OBD data interface; and wherein said vehicle device is configured for realizing said automatic triggering by said starting based on at least an ON signal of said on-board computer via said OBD data interface.

4. The method according to claim 1, wherein said vehicle device is configured for functioning without receiving information from an on-board computer via an OBD data interface.

5. The method according to claim 1, wherein said sensor comprises a GPS receiver; wherein said first detected movement pattern relates to staying at one same detected GPS location for a period of time exceeding a predetermined time threshold; wherein said second detected movement pattern relates to changing a detected GPS location; wherein a sleep mode of said vehicle device is associated with said GPS receiver being switched off and said accelerometer being fed; wherein a detection of vehicle movement by said accelerometer is a trigger for activation of the GPS receiver, and wherein said ending of said parking session in step (f) is based on movement which has been detected by both the accelerometer and the GPS receiver.

6. The method according to claim 1, wherein said vehicle device comprises a GPS receiver and/or at least one of: a wireless network interface, a Bluetooth interface, a Wi-Fi interface, a GSM interface, a mobile data interface, and/or an RFID interface.

7. The method according to claim 1, wherein said session request or said session related information comprises: (1) a specification of said vehicle, account data of said user, or a first parameter intended for an operator; and (2) a second parameter intended for a third party.

8. The method according to claim 1, wherein said vehicle device comprises a security sensor which belongs to said sensor if present; wherein said session request or said session related information comprises a security parameter of said vehicle; wherein said security parameter is continuously tracked by said security sensor; and wherein said security parameter relates to one or more of the following aspects of said vehicle: an open door, an open boot lid, an activity of a parking lock, an intact window, displacement of said vehicle, activating an alarm, and/or a going off of an alarm.

9. The method according to claim 8, wherein said security parameter is also tracked at a time falling outside said parking session.

10. The method according to claim 1, wherein said user receives one or more electronic messages on a user computing device with respect to said parking session, wherein said one or more electronic messages comprise session related information or an indication of said price.

11. The method according to claim 10, wherein said user receives a state message belonging to said one or more electronic messages prior to said arrival of said vehicle at said parking location in step (a), wherein said state message comprises an availability of said parking location with respect to said vehicle and/or said price indication.

12. The method according to claim 1, wherein the OBD dongle comprises an OBD connector, and the vehicle does not provide access to vehicle information via an OBD data interface.

13. The method according to claim 1, wherein the OBD dongle comprises an OBD connector, and the vehicle is an electric vehicle.

14. A system for payment of a service and/or a product, comprising:
(i) a vehicle device, comprising: a processor; tangible non-volatile memory; programming on said memory to control said vehicle device; a GPS receiver; and one or more wireless network interfaces comprising a Bluetooth interface, a Wi-Fi interface, a GSM interface, a mobile data interface, and/or an RFID interface; wherein said vehicle device is an OBD dongle and is provided with an OBD connector; and wherein said vehicle device comprises a sensor;

(ii) a back-end infrastructure comprising a back-end server for communicating with said vehicle device;
(iii) a third-party server for managing an availability and a price of a parking location; and
(iv) a user device, wherein said user device comprises a user device processor, tangible non-volatile user device memory, programming on said user device memory to control said user device processor, a screen, and a wireless network interface;

wherein said vehicle device is configured:
to be connected to a vehicle by means of said OBD connector,
to be connected in a wireless way to said back-end infrastructure,
to be connected in a wireless way to said user device,
to detect a switching-off and a starting of an engine of said vehicle at said parking location,
to transmit, triggered in response to said switching-off, a session request comprising a coordinate to said back-end infrastructure,
to receive an availability and/or a price indication with respect to said parking location from said back-end infrastructure, wherein a parking session belonging to said service and/or said product is initiated if said parking location is available,
to register and/or to transmit session related information to said back-end infrastructure and/or to said user device, wherein said session related information comprises one or more of: a specification of said vehicle, account data of a user of the user device, a first parameter intended for an operator, a second parameter intended for a third party, and/or a security parameter, and
to end said parking session in response to being triggered by said starting, thereby sending a termination notification to said back-end infrastructure;

wherein said back-end infrastructure is configured:
to correlate said coordinate received from said vehicle device with said parking location,
to transmit an availability request comprising said parking location to said third-party server,
to receive said availability and/or said price indication from said third-party server and to transmit it to said vehicle device, wherein the parking session belonging to said service and/or said product is initiated if said parking location is available,
to receive said session related information from said vehicle device and to transmit it at least partially to said third-party server and/or said user device,
to receive said termination notification from said vehicle device and to transmit it to said third-party server, and
to receive the price from said third-party server and to make the payment;

wherein said third-party server is configured:
to receive said availability request comprising said parking location from said back-end infrastructure,
to transmit said availability and/or said price indication to said back-end infrastructure, thereby initiating said parking session if said parking location is available,
to receive said session related information from said back-end infrastructure,
to receive said termination notification from said back-end infrastructure, and to calculate said price for said service and/or said product and to transmit it to said back-end infrastructure; and wherein said user device is configured:
to receive said session related information from said back-end infrastructure and/or from said vehicle device, and
to display said session related information on said screen; and wherein said price is a function of at least said parking location and a session duration; wherein said payment is made automatically; wherein the sensor is adapted to detect a movement pattern with respect to said vehicle, to detect a movement pattern of said vehicle; wherein, in response to the vehicle device at least having detected a first movement pattern with said sensor, said vehicle device became configured to react by said triggering in response to said switching-off of said engine of said vehicle; wherein, in response to the vehicle device at least having detected a second movement pattern with said sensor, said vehicle device became configured to react by said being triggered by said starting of said engine of said vehicle; wherein said sensor comprises an accelerometer; wherein said first detected movement pattern relates to a deceleration of said vehicle; and wherein said second detected movement pattern relates to an acceleration of said vehicle.

* * * * *